United States Patent [19]

Veneruso

[11] Patent Number: 5,136,286
[45] Date of Patent: Aug. 4, 1992

[54] SWITCHED CAPACITANCE METER READING DEVICE USING VARIABLE WIDTH ELECTRODES

[75] Inventor: John E. Veneruso, Fort Worth, Tex.

[73] Assignee: Siecor Corporation, Hickory, N.C.

[21] Appl. No.: 471,513

[22] Filed: Jan. 29, 1990

[51] Int. Cl.$^5$ .............................................. G08C 19/10
[52] U.S. Cl. ...................... 340/870.37; 340/870.02;
340/870.04; 324/660; 364/556
[58] Field of Search ............ 340/870.02, 870.07,
340/870.37, 870.04; 324/660; 364/480, 556

[56] References Cited

U.S. PATENT DOCUMENTS

| | | | |
|---|---|---|---|
| 3,312,892 | 4/1967 | Parnes | 340/870.37 |
| 3,683,402 | 8/1972 | Parnell | 340/870.37 |
| 4,007,454 | 2/1977 | Cain et al. | 340/870.37 |
| 4,165,505 | 8/1979 | Cain et al. | 340/870.37 |
| 4,429,308 | 1/1984 | Shankle | 340/870.02 |
| 4,433,332 | 2/1984 | Wason | 340/870.37 |
| 4,477,860 | 10/1984 | Wason et al. | 340/870.37 |
| 4,606,008 | 8/1986 | Wason | 340/870.37 |
| 4,779,094 | 10/1988 | Lee et al. | 340/870.37 |
| 4,924,407 | 5/1990 | King et al. | 340/870.37 |

OTHER PUBLICATIONS

Microelectronics Digital & Analog Circuits and Systems, Jacob Millman, McGraw-Hill Publishers, 1979 pp. 312-315, 523-529, 569-573, 599-600, 606-615, 618-620.
Motorola Linear Integrated Circuits, Series C, 1979, pp. 3-31.
Electronic Devices and Circuits, Discrete and Integrated, M. S. Ghausi, Holt, Rinehart and Winston, 1985, pp. 431-434.

Primary Examiner—Donald J. Yusko
Assistant Examiner—Michael Horabik
Attorney, Agent, or Firm—Roy B. Moffitt

[57] ABSTRACT

A humidity and temperature resistant apparatus for determining the orientation of a rotatable meter hand relative to a dial spaced apart from a meter hand that creates and depletes a charge between a center electrode, a meter hand, and an outer variable width electrode array very rapidly to transport electrons through a resistor capacitor combination attached to a positive power supply whereby the average current drawn through the resistor capacitor combination creates a voltage that corresponds proportionally to the magnitude of the capacitance being measured. The variable width electrode array is disposed on a surface of a substrate delimiting a center portion containing an aperture for receiving a rotatable member, and includes a center electrode located in the center portion on the surface of the substrate at least partially circumscribing the aperture and a calibration ring that circumscribes and is spaced apart from the center electrode.

32 Claims, 10 Drawing Sheets

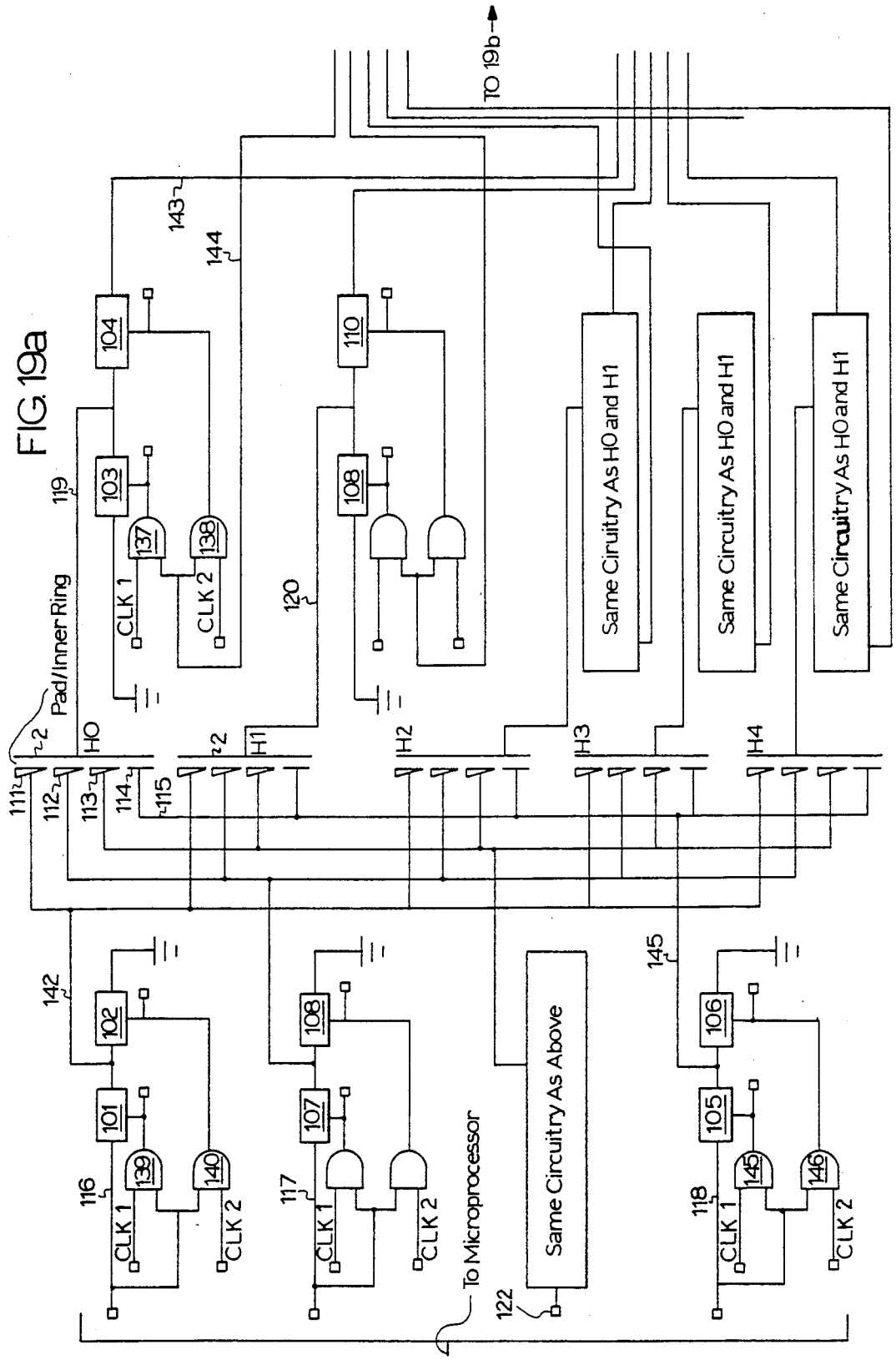

Note: The port assignment lables are listed in Motorola Microprocessor literature.

SWITCHED CAPACITANCE METER READING DEVICE USING VARIABLE WIDTH ELECTRODES

BACKGROUND OF THE INVENTION

Prior art encoders use ten metallized pads delimiting a center portion containing a center electrode or inner ring made of metallized material. Each group of ten pads and inner ring or center conductor is called "dial." On electric meters, there are normally five dials. Such encoders use capacitive coupling to locate the position of the meter hands and a microprocessor associated with the encoder selects one pad at a time and one dial at a time. If the meter hand is over the selected pad, the pad/meter hand/inner ring capacitance is large. If the meter hand is not over the pad, the pad/inner ring capacitance is relatively small. This capacitance is measured and digitized and the digitized information is then processed by a microprocessor. The microprocessor compares the magnitude of the capacitance associated with each pad on a given dial. It locates the meter hand on the dial by finding the pad or two adjacent pads that have much larger capacitance than all of the other pads on the same dial and locates the meter hand on each dial by the same algorithm, or problem solving routine.

Reference is made to FIGS. 1 and 2. When the meter hand 9-10 is far away, (i.e., 25 mils) from the printed circuit board element 6, 7 and 8 of FIG. 1, the measured pad/inner ring capacitances will be on average much smaller if the meter hand had been very close to the board. If the meter hand is near the board the change in capacitances between the tail end and sides of the meter hand 9-10 and the pads 4-1 through 4-10 it is pointed to are much greater than when the meter hand is far away from the board. Consequently, all of the ten pads' responses must be compared with each other to determine the meter hand position.

When there are five dials involved, each of the like numbered pads of every dial is connected together. There are more than five dials on gas meter encoders. To select a dial, the dial's inner ring 2 is selected using one or more multiplexers. Each like number pad must be connected to circuitry to excite it with a set frequency signal. Multiplexers are used to route a Wien Bridge Oscillator 115 KHz to 175 Khz sine wave signal to the desired pad. Prior art encoders also use a square-wave generator made up of inverters and a resistor/capacitor combination, to generate a high frequency signal wave shaped to simulate the sine wave. Prior art wave shaping was performed by using a series resistor to each pad, high valued, precision, 1% tolerance resistors and the input capacitance of 10 microprocessor input ports for a 5 dial encoder. With this in mind it would be desirable to reduce the number of multiplexers required, the number of precision resistors and microprocessor input/output ports.

The present invention employs the technique of switch capacitance. This technique allows the number of pads to be reduced and to realize the savings that arise therefrom. Switch capacitance technique uses two CMOS analog switches per pad and two CMOS analog switches per inner ring or center electrode. In addition, it uses an equal number of AND Gates to properly Gate the clock signals that switch charges into and out of the pad and inner ring. Applicant has found that the output voltage varied in linear proportional manner with a change in capacitance between the selected pad and inner ring using this technique. Changes in capacitance were as small as 0.1 picofarads and were easily measured. When this signal was digitized, the linearity and proportionality was such that it could be preserved.

Digitized information of prior art encoders was used to determine a simple question: Is the meter hand over a particular pad or is it not? The decision was a binary one, having only two states or answers, yea or nay. Because each pad corresponded to one of the ten digits on a dial, this was an effective approach. However, the prior art did not address the situation where the pad did not correspond one for one with the ten digits on a dial. Prior art encoders use an eight bit analog to digital converter to achieve a required large degree of resolution. The prior art employs an analog to digital converter to convert the voltage, proportional to the pad inner ring capacitance, into an eight bit binary number, representing one of the 256 discreet voltage increments of this device. Consequently, there is an abundance of information available from a given dial that is thrown away by the prior art that could be used to determine not just whether the meter hand is over a selected pad, but where the meter hand is over a given pad.

Instead of using ten metallized pads and one inner ring (center electrode) per dial as prior art encoders, the present invention envisions a minimum of one or more electrodes or pads, a calibration ring and a center electrode or inner ring. By reducing the number of pads per dial the number of CMOS analog switches are reduced, a decoder is not needed and the number of input/output pins of a microprocessor are reduced. The present invention envisions a minimum of two pads (see FIG. 5) and one calibration ring. This requires only three microprocessor input/output pins to select a pad or calibration ring. The primary function of the center electrode or inner ring is considered a common point, selected when its respective dial must be read.

In prior art encoders, the distance between the meter hand and the printed circuit board is a variable distance. This is one of the major reasons that ten pads were used by the prior art. The capacitance formed between the pad/meter hands/inner ring is proportional to the distance between the board and the meter hand and the area of the pad(s) that the meter hand roughly shadows or covers. The shadow is similar to that cast by a human hand in diffused light. By holding one's hand just above a piece of paper, it can be noticed that a well defined shadow is formed on the page when the hand is close to the paper. As the hand is moved slowly away from the paper, the outlines of the hand get fuzzy and shadows more area of the paper. Capacitance between two electrodes is governed by the same principle. The more intense the shadow, the greater the capacitance. The fuzzier the shadow, the weaker the capacitance per unit area. By shadowing, it is not meant shadowing caused by light, but an electrical field created by exciting the pad and the inner ring electrode with a voltage signal or a voltage potential. Capacitance between the pad and the meter hand is defined approximately by the formula that $C = e0*A/d$. Wherein C is equal to capacitance, e0 equals permittivity of free space or air, and d equals the distance between electrode plates, namely the meter hand and metallized pad. This formula assumes that the plates are so close that there are very minor fringing capacitance effects, analog to a well defined shadow cast by a lighted object. As the plates move farther apart, the capacitance between them is found somewhere between the value of capacitance given by the first formula and $C = e0*A/d2$, which is the capacitance between two electrode points, which if lit with a light, would cast very ill defined shadows on each other.

As the meter hand is moved away from the PC board, increasing the distance between the dial's pads and the meter hand, the capacitance between the tip of the meter hand and the pad underneath becomes smaller. As the meter hand is moved away from the board, the meter hand sides cast more of a shadow on all of the other pads. Eventually, as the meter hand is moved away from the board, the capacitance formed becomes so diffuse that it is impossible to tell where the meter hand actually is pointing. This invention addresses these problems with solutions and provides a combination of elements that permits the use of a variable width electrode and a simplified receiver circuit employing a minimum of CMOS switches and multiplexer input/out ports.

BRIEF DESCRIPTION OF THE DRAWINGS

FIGS. 19a and 19b are is a detailed schematic of the invention employing a variable width electrode.

DETAILED DESCRIPTION OF THE INVENTION

Figure 1:
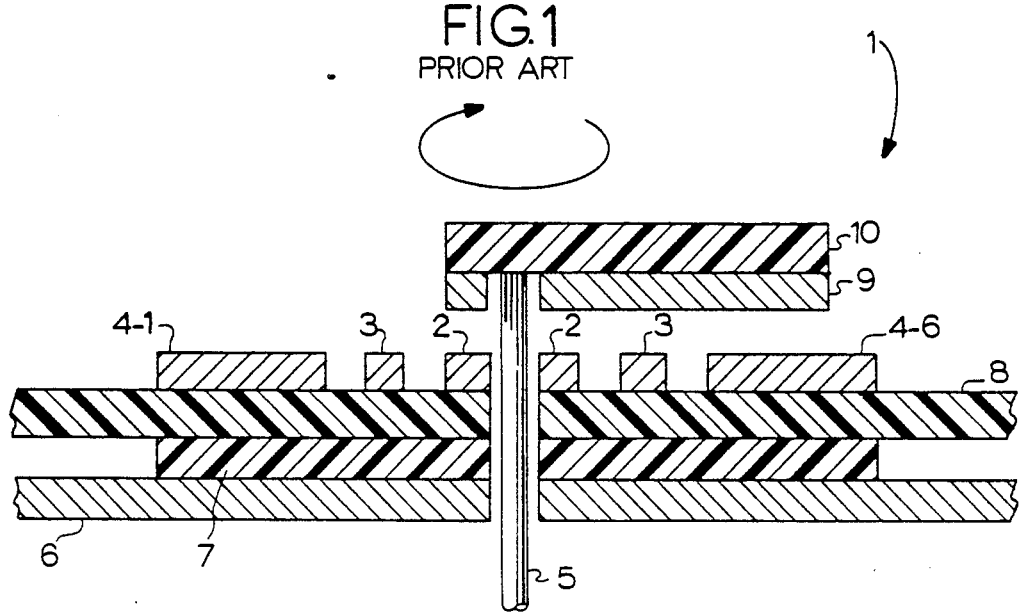
FIG. 1 is a cross-sectional view of a prior art electrode array.
Figure 2:
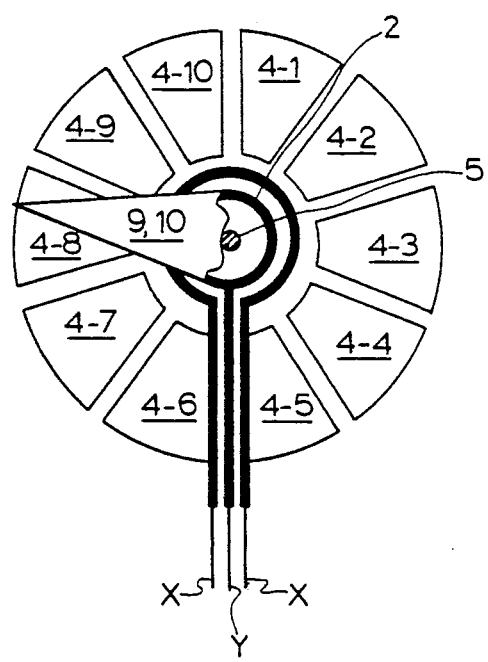
FIG. 2 is a plan view of a prior art electrode array.
Figure 3:
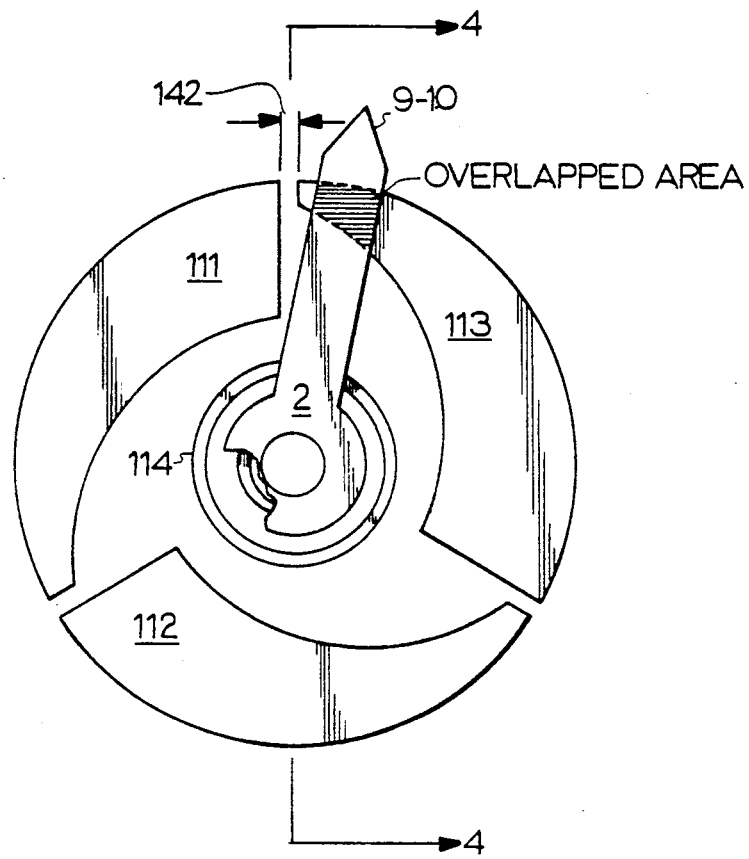
FIG. 3 is a plan view of a variable width electrode as envisioned by the present invention.
Figure 4:
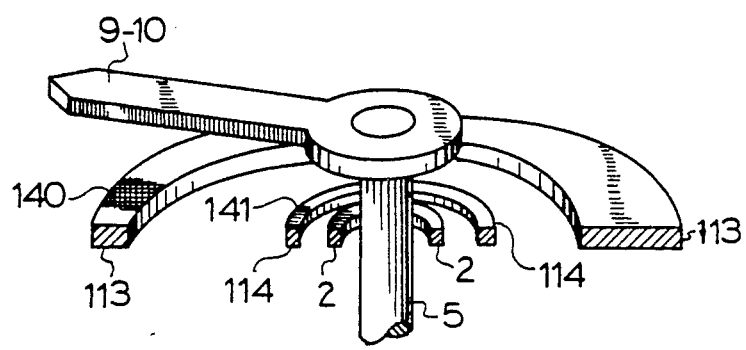
FIG. 4 is a cross-sectional view of the electrode, inner ring and calibration ring of FIG. 3.

Reference is now made to FIGS. 3 and 4. If the meter hand distance from the PC board were known, it would be possible to use fewer than one pad per dial digit in comparison to prior art encoders. Each meter hand of a given dial can be a different distance from the PC board, arising out of manufacturing variances compared to other dial hands of other dials. Consequently, each meter hand distance must be individually determined. To determine such a distance, a calibration ring 114 is used. Calibration ring 114 is a continuous, circular, constant width, metallized, electrically conductive trace ring that is spaced apart from both the variable width electrodes 111, 112 and 113 and inner ring (center electrode pad 2). It circumscribes the center electrode and lies on the common surface along with the center electrode 2 and variable width electrodes 111, 112 and 113. To allow the microprocessor 100 to determine the position of the meter hand not using one pad per digit or a bit of resolution, a variable width pad must be used. Hereafter the variable width pad is referred to by its acronym VWP. A VWP is a relatively flat electrode that is wide at one end and tapers to a much smaller width at the other end. Note the variable width electrode or pads 111, 112 and 113 of FIG. 3. The VWP is wrapped, in a single plane, about a common point, such as a meter hand shaft 5. Note FIG. 4. Calibration ring 114 can be made so it surrounds the VWPs or is disposed between the inner ring 2 and the VWPs. Compare the configurations of FIGS. 7 and 8 with the configurations of 9 and 10 for example. As the meter hand electrode rotates about its axis it shadows a constant area of the calibration ring. See element 141. Calibration ring 114 is connected to two CMOS analog switches 105 and 106 of FIG. 19 or is excited by signal driving and source, like pads in prior art devices. The capacitance formed between the inner ring/meter hand/calibration ring is referred to hereafter as IMC. This capacitance is constant for a given meter hand and the PC board distance. As the meter hand moves away from the board, the IMC capacitance decreases. As the meter hand moves closer to the PC board, the capacitance increases.

Knowing the meter hand distance from the board will help determine the rotational position of the meter hand. If there is one VWP wrapped around the dial, the meter hand would shadow a variable area of the pad or electrode as the hand rotates about its axis. See element 140. The capacitance formed between the inner ring/meter hand/ variable width pad is referred to hereafter as INV. INV capacitance is dependent on the area of the pad that the meter hand directly overlaps and the distance that the meter hand is from the PC board. Thus, every meter hand position creates a unique combination of INV and IMC capacitance.

Reference is now made to FIG. 3. Here the meter hand is near the PC board and is pointed just a few degrees clock wise from top dead center. If the distance to the PC board is small, the IMC capacitance is large. The INV capacitance is relatively small since the meter hand overlaps a very small pad area. Employing a look-up table in a microprocessor memory, the microprocessor is able to use such a combination to calculate the rotational position of the meter hand. If the meter hand has moved away from the PC board, but is held in the same rotational position, the INV capacitance will become smaller as the distance from the board is increased. The IMC capacitance also becomes smaller as the meter hand is moved away from the PC board. Employing both pieces of information, the microprocessor can adjust the measured and digitized IMV's capacitance reading and locate the rotational position of the meter hand.

Using only a single VWP does not allow the position of the meter hand to be unambiguously located. If the meter hand partially shadows both the largest width section and the smallest width section, which would occur if the meter hand were pointing straight up, the IMV capacitance would be the same as if the meter hand pointed to a different location on the pad, shadowing the same pad area. A single VWP has another drawback in that the variable width cannot vary much around the dial. The maximum diameter of the dial is constrained by the presence of the nearby adjacent dials on most meters. The minimum width is constrained by the smallest capacitance that can be measured with the capacitance measuring technique. The resolution of the capacitance measurement must be adequate to resolve the position of the meter hand to a half a digit or 18° of rotation.

Figure 5:
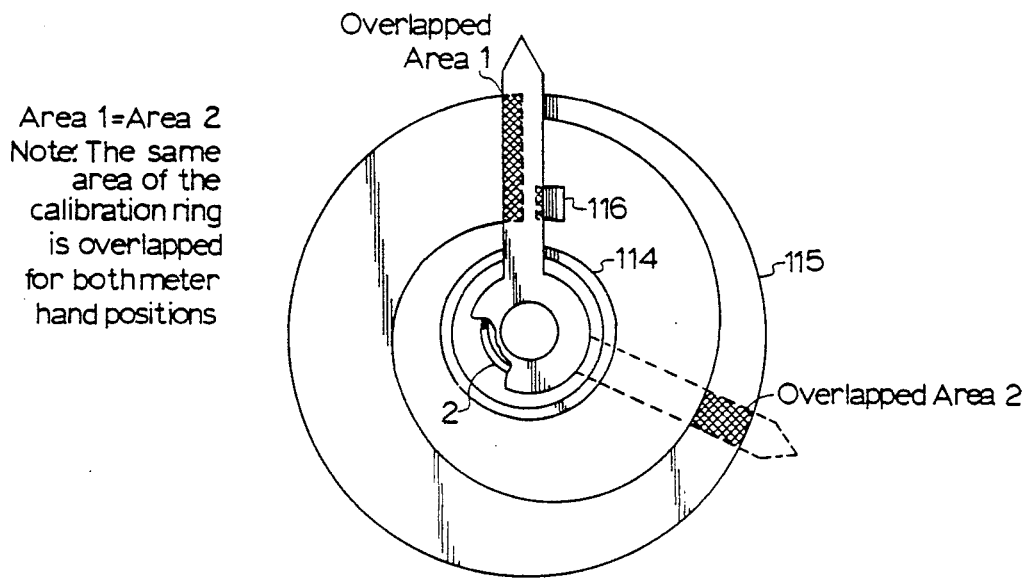
FIGS. 5 AND 6 are plan views of a variable width electrode used by the present invention showing how ambiguity problem arising out of meter hand position is resolved.
Figure 6:
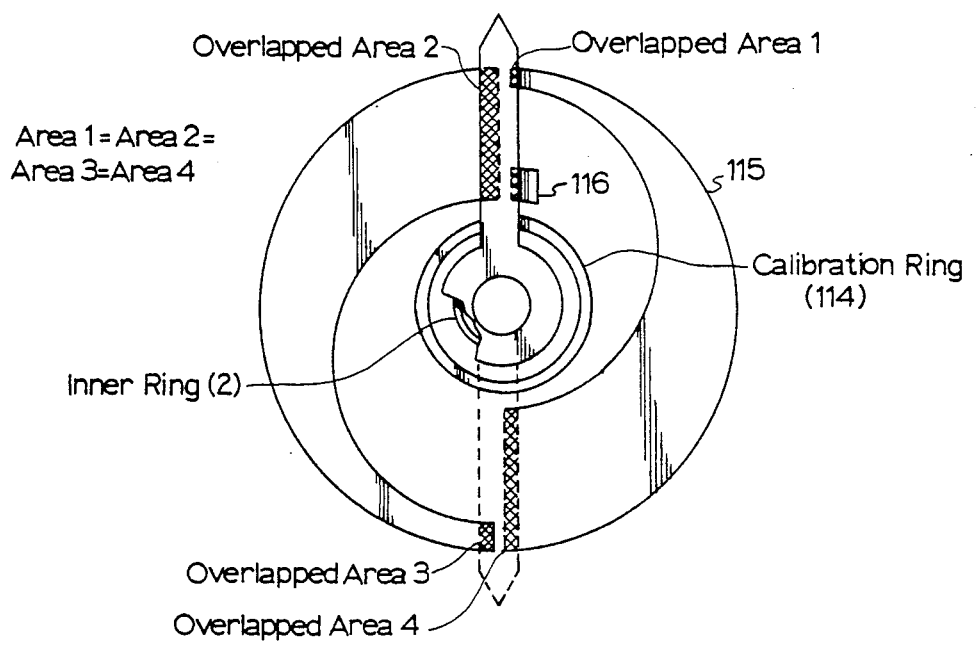

There are two different solutions to the rotational position ambiguity problem. One is by adding more VWPs or adding a small pad segment that lies near the smallest and largest width section of the VWP. Note, for example, 116 of FIG. 5. With the addition of a small pad segment 116, the inner ring/meter hand/small pad segment capacitance can be measured. If the meter hand shadows the small segment, the meter hand is known to be pointing straight up, regardless of the meter hand's distance from the board. In this case, IMV capacitance is ignored in determining whether the meter hand points to the top of the dial. All other positions of the VWP form a unique capacitance ratio, IMV:IMC. A two VWPs array presents the same ambiguity program as the one VWP array. Note FIG. 6. If the meter hand is shadowing both pads, it is impossible to tell whether the meter hand is pointing towards one gap between the pads or another gap, without additional information. The addition of small pad segment 116 near one of the two gaps resolves this problem. The "gap" is located between the wider section of one VWP and the shortest section of the same VWP or between two VWPs. If only one VWP is used, there may or may not be a true gap present, but for purposes of illustration, the term "gap" will be used to describe the area of the dial in which the widest section of the VWP and the narrowest section meet in spaced apart confronting relationship to one another. No resolution is required due to circuit limitations. A three or more VWP version is the answer. See FIGS. 15, 16, 17 and 18. Only the one and two VWP configurations require a small pad segment determined if the meter hand is pointing towards a VWP gap.

By using three or more variable width bands, small pad segment 116 is not needed. If a meter hand is located above the gap between two VWPs, it cannot be confused with another gap location, since one of the three pads will not have the meter hand shadowing it. The meter hand can only shadow a maximum of two VWPs at one time. Stray capacitance that exists between the un-shadowed VWP and the inner ring or center electrode is much smaller than any IMV capacitance. Thus, the microprocessor can easily determine which gap, if any, the meter hand is shadowing. Stray capacitance is the undesirable capacitance that exists between two or more electrodes. Stray capacitance is also capacitance that exists where it is not wanted, causing capacitive measurement errors and loss of resolution in the case of encoding the rotational position of the electrode. Because measured capacitance can be obscured by excessive stray capacitance, it is desired to keep the stray proportion to a minimum.

Figure 7:
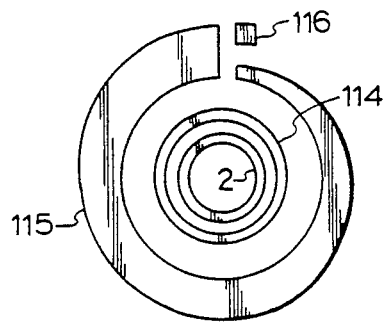
FIGS. 7, 8, 9, 10, 11, 12, 13, 14, 15, 16, 17, and 18 are plan views of various species of the variable with electrode envisioned by the present invention.

Reference is now made to FIG. 7. This embodiment uses the fewest pads possible to determine the rotational position of a meter hand. The position and functions of the inner ring and calibration ring can be swapped while still maintaining a working dial layout design. The single VWP inner band ring 115 is a constant distance from the center of the dial. Variable width pad 115 varies gradually from some unspecified maximum width to an unspecified minimum width. The maximum and minimum widths will be different depending on the size of the dial, resolution required and manufacturability. Capacitance between the inner ring 2, meter hand 9-10 and calibration ring 114 is used to determine the meter hand or electrode distance from the PC board. Variable capacitance, depending on rotational position of the meter hand, is formed between the inner ring 2, meter hand and variable width pad 115. The variable capacitance is adjusted for the calculated distance from the board and the rotational position of the meter hand as computed by using a mathematical formula or look-up table. One small pad segment 116 is required near the gap or the line between the widest and smallest VWP's free edge to determine if the meter hand is pointing in the gap's direction or in some other direction. It will be noted that variable width pad 115 is delimited by first, second, third and fourth free edges. The first free edge is in confronting spaced apart relationship with the third free edge and it is longer than the third free edge. All other variable width electrodes as shown in FIGS. 8 through 18 of the same geometric configuration.

Figure 8:
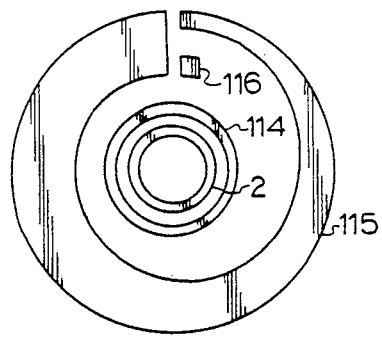

Reference is now made to FIG. 8. The embodiment shown in this figure contains the same elements as the embodiment shown in FIG. 7, the only difference being the location, the small pad segment 116 and VWP 115. VWP 115 is a constant outer diameter or a distance from dial center. The variation in width occurs in the inner VWP edge, wide at one point and gradually becoming narrower. Small pad segment 116 is positioned within the outer diameter of VWP 115. By locating small pad segment 116 within the VWP's inner edge, the VWP's area can be maximized for a given dial diameter, maximizing the IMV capacitance in relation to the stray capacitance. Because the inner edge of the VWP 115 on average is further away from the inner ring relative to that shown in FIG. 7, stray capacitance is much less and than that embodiment shown in FIG. 7. Both of the embodiments of FIG. 7 and 8 are preferred to those embodiments shown in FIGS. 9 and 10 described hereafter.

Figure 9:
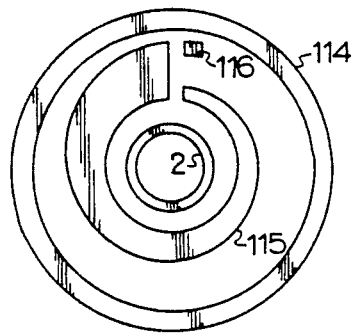

Reference is now made to FIG. 9. This embodiment is a single VWP design and is similar to the embodiment shown in FIG. 4 in that the inner edge of VWP 115 is a constant distance from the inner ring or center electrode. Calibration ring 116 encircles VWP 115, small pad segment 116 and inner ring 2. VWP 115 lies within calibration ring 114 and surrounds inner ring 2. Small pad segment 116 is used to eliminate meter hand position ambiguity when it points to the VWP gap as in the two embodiments described previously. Small pad segment 116 is further out from the dial center than the minimum width section of the VWP 115. Note that the total VWP area is much less than that in FIG. 7 and 8. The minimum IMV capacitance that must be detected for a given level of resolution will be less for this version than those above. To maintain the same resolution as the embodiment of FIGS. 7 and 8, the meter hand must be made narrower so that it shadows overlaps the same ratio of the VWP area divided by the total VWP area. By making the meter hand narrower, the maximum IMV capacitance decreases. If the minimum IMV capacitance is too small, less than 0.05 picofarads, problems may be encountered.

Figure 10:
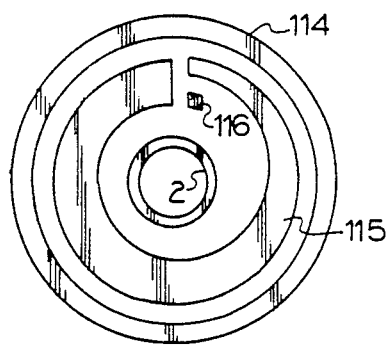

Reference now is made to FIG. 10, a single VWP embodiment. This figure is similar to the embodiment of FIG. 8, in that the VWP's 115 outer edge is a constant distance from inner ring 2. Calibration ring 114 encircles VWP 115, small pad segment 116 and inner ring 2. Small pad segment 116 is located closer to the dial's center than the minimum width section of the VWP 115 and is located near the VWP gap. The IMV stray capacitance is less than that of the embodiment of FIG. 9.

Figure 11:
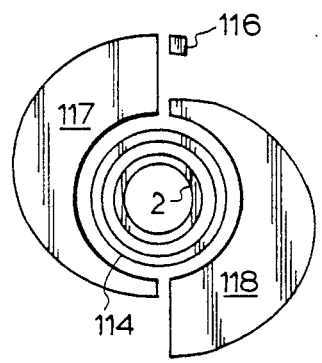

Reference is now made to FIG. 11, a two VWP design. It should be noted that there are four basic configurations for a two VWP design as there were for the single VWP design. The embodiment shown in this figure has a calibration ring 114 and inner ring 2 inside the edge of VWPs 117 and 118 so that the VWP's area can be maximized. The inner edge of VWP's 117 and 118 is a constant distance from inner ring 2. The outer edge of VWP's 117 and 118 tapers gradually inward from the wide to the narrow portion of the respective VWPs. Only one small pad segment 116 is needed to resolve the meter hand rotation position ambiguity that exists when the meter hand is pointing in the direction of either gap. Without the small pad segment 116, it would be impossible to know which gap the meter hand pointed to if IMV capacitance of both the VWPs was equal. The equal area of both pads could conceivably be shadowed when the meter hand pointed in the direction of one of the two VWP's gaps. This ambiguous situation is different than that experienced in the single VWP designs.

Although the embodiment of FIG. 11 shows two VWP pads as having a widest area of one VWP near the narrowest area of the adjacent VWP. This does not have to be the case to insure proper operation. As long as microprocessor 200 is programmed to expect that the widest section of one VWP 117 will be near the widest section of another VWP 118, there would not be a problem in locating the meter hand electrode. There will, however, be a higher level of stray capacitance between the two VWPs 117 and 118 since a large length of VWP edge is in close proximity to the other VWP's edge. For the sake of aesthetics and reduced stray capacitance, all of the two and three VWP designs shown herein are shown with the widest section near the narrowest section of the adjacent VWPs.

Figure 12:
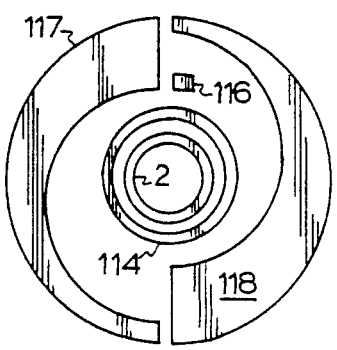

Reference is now made to FIG. 12, a two VWP design. The embodiment shown in this figure has both inner ring 2 and calibration ring 114 located inside the inner edge of the VWPs 117 and 118. The VWP's outer edges are located a constant distance from inner ring 2. The inner edge distance to the inner ring 2 varies with the width of the VWP's 117 and 118. A small pad segment 116 is needed as described above, and is located within the inner edge of the VWPs 117 and 118.

Figure 13:
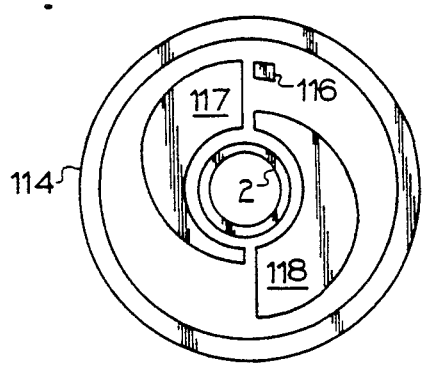

Reference is now made to FIG. 13, a two VMP design. This embodiment is similar to the two VWP embodiments shown in FIG. 7 described above. Instead of the calibration ring 114 being located within the inner edge of the VWPs 117 and 118. It is located around the VWPs, small pad segment 116, and inner ring 2. The VWP's inner edge is a constant distance from inner ring 2, forcing the outer edge to become increasingly close to the outer calibration ring as the VWPs 117 and 118 become wider. A small pad segment 116 is used, as it is for the other two VWP versions, to properly locate the meter hand when it is pointing towards one of the two VWP gaps. Small pad segment 116 is located farther away from inner ring 2 than the outer edge of the narrowest section of one of the two VWPs 117 and 118

Figure 14:
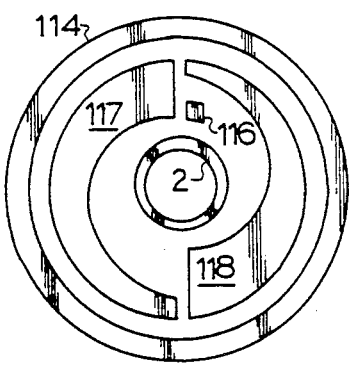

Reference is now made to FIG. 14, a two VWP design. This embodiment is similar to the VWP embodiments shown in FIG. 8, in that the outer edge of the two VWPs is a constant distance from inner ring 2. VWP's 117 and 118 inner edge varies in distance from inner ring 2 with the individual VWP's width. Calibration ring 114 is located around the two VWPs 117 and 118, small pad segment 116 and inner ring 2. Small pad segment 116 is used as it is for the previous two VWP embodiments and is located nearer to inner ring 2 than the narrowest portion of one of the VWPs 117 and 118.

Figure 15:
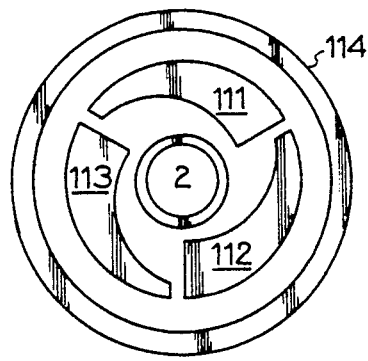

Reference now is made to FIG. 15, a three VWP embodiment. This embodiment does not require a small pad segment like the one and two VWP embodiments. A meter hand electrode cannot shadow or point to more than one gap at a time, and therefore cannot shadow more than two of the VWPs at one time. Because at least one of the VWPs is not shadowed by the meter hand electrode, by process of elimination, a microprocessor can determine which VWP gap the meter hand is pointing to, if it is pointing to any of them. The three VWP design is superior to the two VWP embodiment because the three VWP embodiment allows rotational direction of the meter hand electrode to be found with a greater degree of resolution. Each of the three VWPs tapers more rapidly, because they span a shorter arc about the center portion. Because they taper more rapidly, the IMV capacitance changes more rapidly than the one or two VWP embodiments, given a smaller meter hand electrode rotational movement. In addition, the three VWP embodiment requires the same amount of circuitry and number of dial metallization electrodes as the two VWP design. Calibration ring 114 is located around the VWPs and the inner ring. The three VWP's outer edge is located at a constant distance from the inner ring 2. The distance between the inner ring edge and the inner ring 2 varies with the width of the VWPs 111, 112 and 113. This embodiment has a lower IMV stray capacitance than a one VWP design as shown in FIG. 17.

Figure 16:
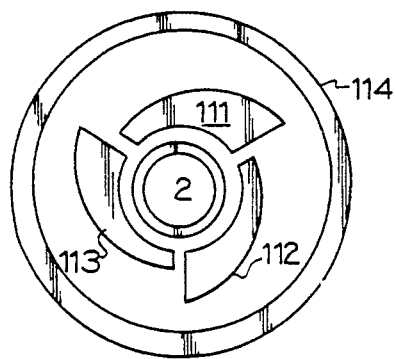

Reference is now made to FIG. 16, another three VWP embodiment. Calibration ring 114 is located around VWPs 111, 112 and 113 and inner ring 2. The three VWP's inner edges are located at a constant distance from inner ring 2. The outer VWP edge distance from inner ring 2 varies with the width of the VWPs. This embodiment has improved resolution over the one and two VWP embodiments.

Figure 17:
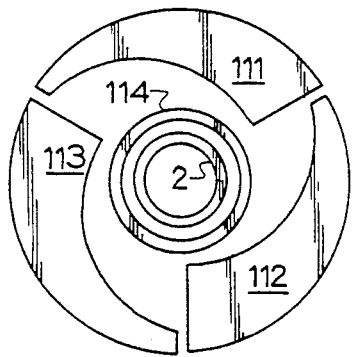

Reference is now made to FIG. 17, another three VWP embodiment. This embodiment is the preferred embodiment. Inner ring 2 and calibration ring 114 are located inside the central area delimited by VWPs 111, 112 and 113. By locating calibration ring 114 inside the inner edge of the VWPs, rather than outside the VWPs, the accuracy with which the meter hand electrodes distance from the PC board can be determined is improved. If calibration ring 114 is located outside VWPs 111, 112 and 113, the IMV stray capacitance will vary with the rotational position of the meter hand electrode. If the meter hand electrode is pointing or shadowing a relatively wide section of a VWP, the IMV stray capacitance will be greater than is the meter hand electrode shadowing a relatively narrow section of a VWP. To accurately determine meter hand PC board distance, the rotational location of the meter hand cannot be allowed to affect the IMV capacitance. The three VWP's outer edges are a constant distance from inner ring 2 in this embodiment. The distance of the inner edge from the inner ring 2 of the three VWPs, varies with their width. Because the average distance from the inner edge of the three VWPs 111, 112 and 113 is greater for a given dial diameter, the IMV's stray capacitance is less for this version than it is for the three VWP design as shown in FIG. 15.

Figure 18:
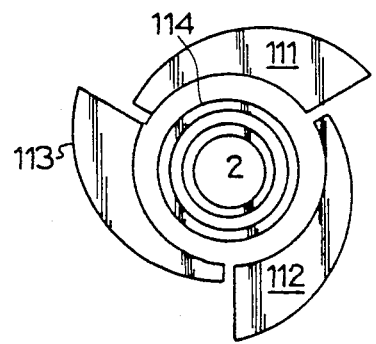

Reference is now made to FIG. 18, a three VWP embodiment. This embodiment 14, calibration ring 114 and inner ring 2 are located inside the inner edge of the three VWPs 111, 112 and 113. The three VWP's inner edge is located a constant distance from inner ring 2.

Figure 19B:
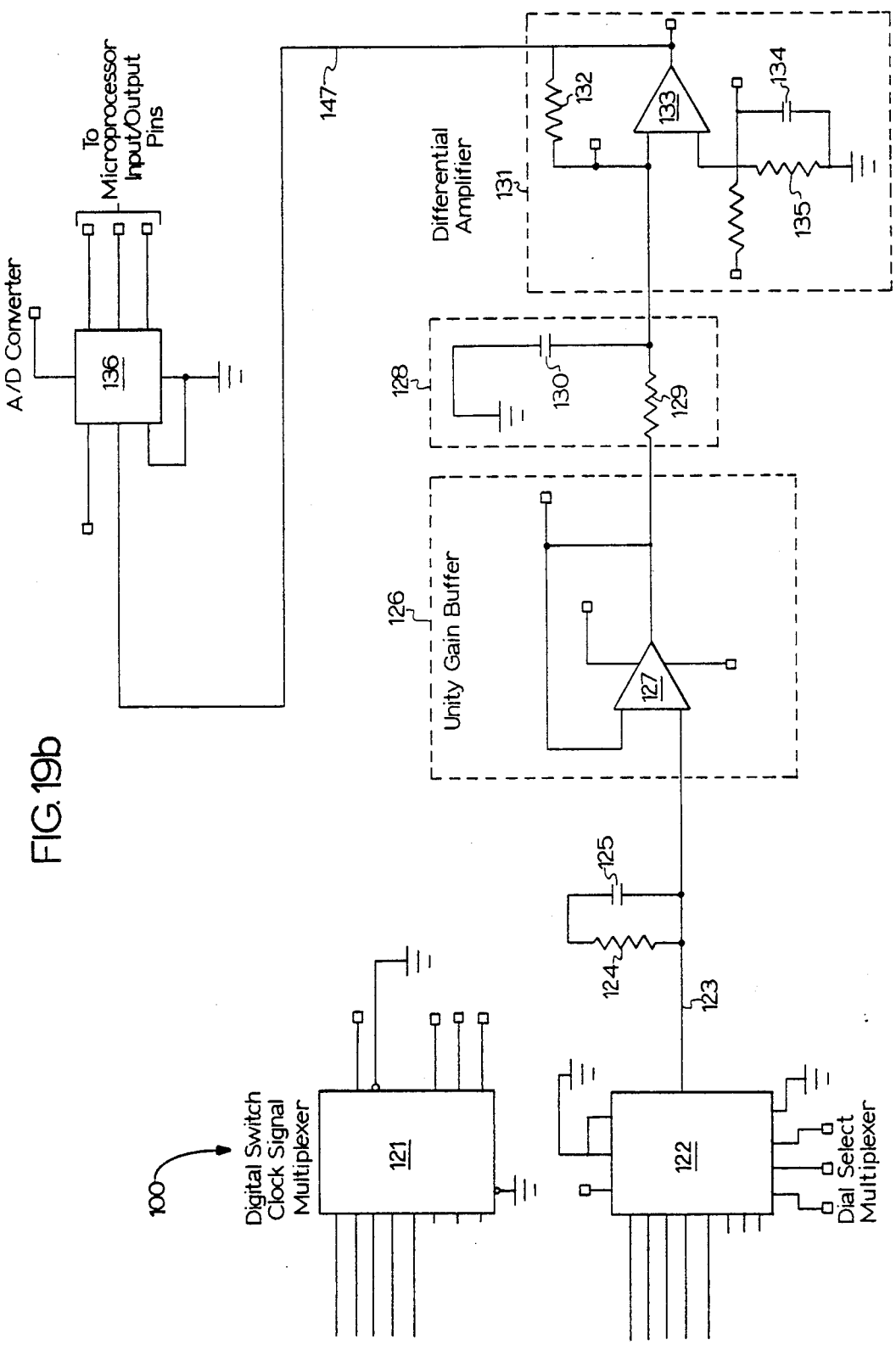
Figure 20:
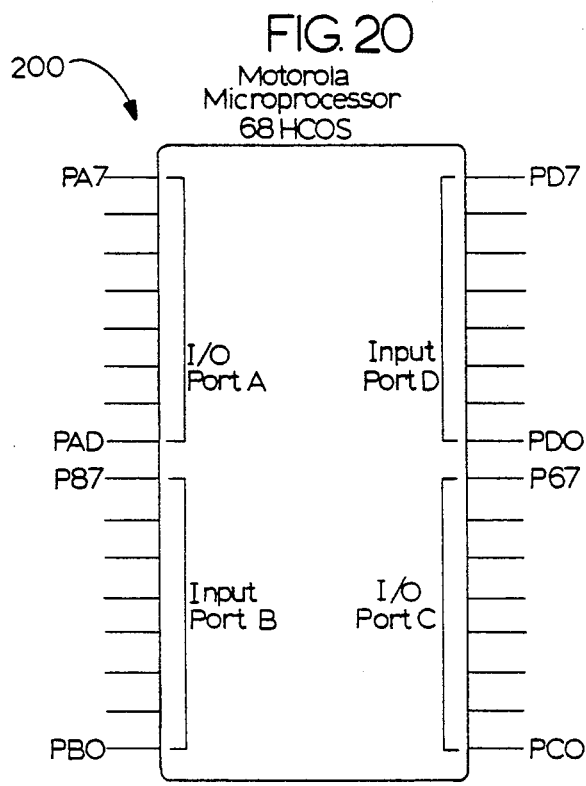
FIG. 20 is a schematic of microprocessor 200.

Reference is now made to FIGS. 19a and 19b which sets forth the best mode for the invention disclosed herein, namely, variable electrode array employing three variable electrodes namely, those shown in FIGS. 15, 16, 17 and 18, which are identified as electrodes 111, 112 and 113, and the receiver circuitry used with it. Element 114 is the calibration ring In the schematic shown in FIG. 19a five dials are shown, H0 through H4. It is to be understood that the corresponding elements in dials H0 through H4 operate in the same way as those that are discussed hereafter. Associated with each dial the first, second, third and fourth analog CMOS switches namely, switches 101, 102, 103 and 104. Switches 101 and 102 are connected to each other through lead 142 and to variable width pad 111. Associated with switch 101 is Clock 1 and with switch 102, Clock 2. Clock one is adapted to be connected to AND Gate 139 and thus to switch 101 and Clock 2 is adapted to be connected to an AND Gate 140 and thus to switch 102. Both switches 101 and 102 are connected through lead 116 to microprocessor 200 (FIG. 20).

Associated with center electrode or inner ring 2 are two CMOS analog switches 103 and 104, are connected to each other and through lead 119 to inner ring 2. Clock 1 is adapted to be connected to switch 103 through AND Gate 137 and Clock 2 is connected through AND Gate 138 to switch 104. Switches 102 and 103 are connected to ground. Switch 104 is connected through AND Gate 138 to first multiplexer 121 and switch 103 is connected through AND Gate 137 to first multiplexer via lead 144. Second multiplexer 122 is connected via lead 143 to switch 104.

Associated with and connected to calibration ring 114 are CMOS analog switches 105 and 106, which are connected to each other through lead 145, connected to the calibration rings of each dial. Switches 105 and 106 are connected to each other and through lead 118 are connected to microprocessor 200. Clock 1 is connected through AND Gate 145 to switch 105 and Clock 2 through AND Gate 146 is connected to switch 106.

Second multiplexer 122 via lead 123 is connected to resistor 124 and capacitor 125. Resistor 124 and capacitor 125 are connected to VCC, a constant DC voltage. Resistor 124 and capacitor 125 are connected to a unity gain buffer 126 comprised mainly of amplifier 127. The unity gain buffer is connected to a low pass filter made up of resistor 129 and capacitor 130, both of which are connected to ground. The low pass filter is connected to differential amplifier 131. Differential amplifier 131 is made up of amplifier 133, bridged by resistor 132 and further connected to resistors 146, 135 and capacitor 134. Resistor 146 is connected to a VCC which is a constant voltage source. Differential amplifier 131 is also connected to digital converter via lead 147 and the analog to digital converter 136 is connected to microprocessor 200.

A step-by-step outline of operation is given below, followed by a more detailed technical description.

(1) Dial Ho's inner ring 2 is selected by sending a digital code from the microprocessor 200 to first and second multiplexers 127 and 122 respectively.

(2) Clock 1 is low, switches 103 and 101 are off or open. Clock 2 is high, switches 104 and 102 are on or closed. (See FIG. 4)

(3) Electrons move from Vcc, through resistor 124 and multiplexer 122 to and switch 104 into inner ring 2. More electrons are attracted to inner ring 2 if the meter hand 9-10 is over the selected pad. Electrons move from the selected pad through switch 102 to ground. If given enough time, a charge equal to +Vcc will develop across the inner ring/pad capacitor. However, before this occurs, step (5) is initiated. The moving electrons create a potential drop or difference across resistor 124 and capacitor 125.

(4) Clock 1 is high, switches 103 and 101 are closed. Clock 2 is low, switches 104 and 102 are open.

(5) Electrons stop passing through switch 104 and into inner ring 2. The voltage potential drop across resistor 24 declines slightly as electrons moving through it begin to discharge capacitor 125.

(6) The electron charge built up on inner ring 2 dissipates through switch 103, which has its other side grounded. Electrons move through switch 101, which is connected to a potential of Vcc-0.1 V, and into the selected Pad.

(7) Steps 2) to 6) are repeated at a frequency between 200 KHz and 750 KHz. Above 750 KHz the switches don't completely close or open in the short cycle time. Below 200 KHz the leakage currents flowing through the switches is nearly equal to the current moving into and out of inner ring 2.

(8) An average voltage is developed between resistor 124 and Switch 104 and it is read by first sending it through unity gain buffer 128. Buffer 128 has a high impedance input so that it does not pull much current and adversely affect the voltage being interpreted. The buffered DC voltage is sent through a low pass filter 128 composed of resistor 129 and capacitor 130. The filter reduces any switching noise to a very low level. The filtered DC voltage is then sent into differential amplifier 131, where its constant offset is subtracted and the difference amplified by an order of approximately five. The amplified voltage will be near ground when the meter hand is not over the selected pad, and near Vcc when the meter hand is directly over, and close to the selected pad.

(9) The voltage at the output of differential amplifier 131 is connected to the input of the analog to digital converter 136, where it is encoded into a digital signal that is recorded by the microprocessor 200.

Figure 21:
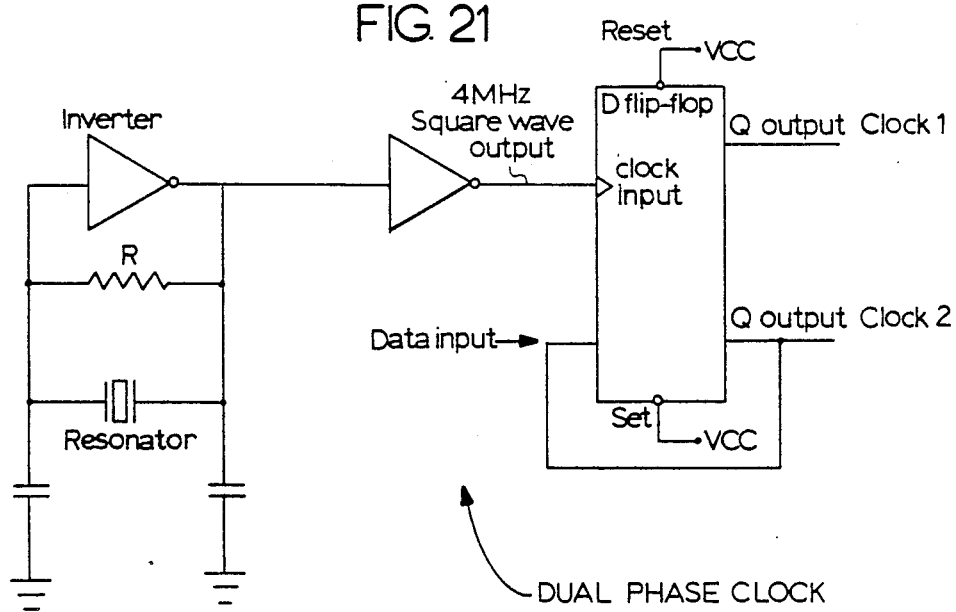
FIG. 21 is a schematic of a dual phase clock.

A high frequency square wave generator or clock (doubling as the clock for the microprocessor) is used to turn the switches on and off. See FIG. 22. The clock signal is fed into a D flip-flop, connected in such a way as to produce dual phase clock signals. One resulting clock signal is low while the other one is high. For small capacitances, the simulated resistance of the four switches, inner ring and pad is high and for large capacitances the simulated resistance is low. The end result is a constant analog voltage level corresponding to the size of the variable capacitor created by the meter hand 9-10, pads 111, 112 and 113 and center electrode 2. The switches connected to the pads are controlled by microprocessor 200 and the dual phase clock of FIG. 21. Microprocessor 200 outputs a digital code, which in turn pulls one of its ten output lines low or near ground, and sends this signal to a selected switch, for example switch 101. The output line is connected to the AND Gates to the input of the CMOS analog switches. When microprocessor 200 sends out the code to select a dial, the AND Gates connected to the selected pad's switches are activated so that the dual phase clock signal can control the CMOS analog switches. The unselected pad's CMOS analog switches are not switched, but are left open, in order to reduce leakage currents, stray capacitive effects, and power consumption. The input line of the selected pad's switch is held high so that maximum charging and discharging of the selected pad and inner ring capacitance can occur.

A dial is selected by microprocessor 200, which outputs a digital code to first and second multiplexers 121 and 122 respectively. The digital code selects which of the eight multiplexed lines will be switched or connected to the single, bidirectional output line. Signals and currents can move between the selected line and the output as if a low resistance wire were physically connected between the two points. Multiplexer 121 activates AND Gates 137 and 138 of the selected dial so that the dual phase clock signals can control the dial's inner ring CMOS analog switches 103 and 104. The unselected dial's inner ring analog switches are not switched, but are left in the open or off state to reduce dial to dial interference and power consumption.

Current is pulled through resistor 124, through switches 103 and 104, with a short stop at the inner ring 2, and then to ground. The average voltage produced between resistor 124 and switch 104 is proportional to the capacitance formed between the pad/meter hand/and inner ring. In order to reduce the number of resistors, like resistor 124 and capacitors, like capacitor 125, a second multiplexer (8 to 1 analog multiplexer) 122 is used. The same digital code that controls multiplexer 121 above, also controls multiplexer 122. Multiplexer 122 connects resistor 124 and capacitor 125 to the desired dial's switch 104 output so that current can flow through resistor 124 and into the activated dial's switches. To reduce unwanted leakage effects, unity gain buffer 126 (an operational amplifier connected to provide for a high impedance input and a low impedance output) is used to supply the current required by the differential stage without pulling additional current through resistor 124 and offsetting the voltage to be measured.

Low pass filter 128, is used to filter out any noise that passes through unity gain buffer 126. The input to differential amplifier 13 is used to smooth the D.C. analog voltage level with little ripple or noise. The junction between resistor 146 and resistor 135 of differential amplifier 131 generates a DC voltage level that is connected to the positive input of op-amp 133. Capacitor 134 filters out any power supply noise and tends to hold the input voltage constant over time. Resistor 132 is a feedback resistor that allows the output voltage to be approximately five times the difference of the voltages applied at the positive op-amp input terminal and the voltage present at the output of the unity gain buffer. Differential amplifier 131 is used to remove the offset due to leakage currents, stray capacitance and other unwanted but constant effects. Amplification is used so that the DC voltage input to the analog to digital converter 136 will swing widely in proportion to the proximity of the meter hand over the selected pad of the selected dial. Such a large voltage swing ensures that an accurate reading can be made, even in electromagnetically noisy environments. Differential amplifier 131 also greatly reduces 60 HZ noise present at the inputs through a process called common mode rejection.

Analog to digital converter 136, is a serial, sample and hold eight bit converter. The input voltage is divided by 256, with each voltage increment assigned an eight bit binary digital code. The output of analog to digital converter 138 is clocked out one bit at a time into microprocessor 200.

Microprocessor 200 scans all of the pads on the encoder and stores a digital code representing the capacitance between each pad and inner ring in internal memory. Using software, microprocessor 200 then determines where the meter hands were and codes an ASCII format output, which is sent through a data output line.

The data output line can also double as a power input line.

Switches 101 and 102 can be Motorola 74HC4066 and AND Gates associated with such witches can be part numbers 74HC08 by Motorola. Switches 103 and 104 can be the same part numbers as switches 102 and 103 and AND Gates associated with such switches can be the same part number as AND Gates previously mentioned.

First multiplexer 121 can be a Motorola 74HC4051 and second multiplexer 122 can be the same part number. Resistor 125 can be 154 K ohms. Capacitor 175 can have a value of 0.1 microfarads. The amplifier of the unity gain buffer 126 can be a Motorola MC33172 and resistor 129 can be a 20 K ohm resistor. Capacitor 130 can have a value of 0.001 microfarads. Differential amplifier 131 includes an amplifier 133 made by Motorola, part number MC33172. Resistor 146 may have a value of 86.6 K ohms, resistor 135 of 50 K ohms, resistor 133 of 100 K ohms and capacitor 135 of 0.1 microfarads. Analog and digital converter 136 can be Motorola part number TLC549 and the microprocessor 200 can be a Motorola 68HC805. It is to be understood that the microprocessor 200 is connected to first and second multiplexers 121 and 122 as well as to switches 101, 102 and Clock 1 and 2.

Notice is now directed to elements 116, 117, 118, and 122. Pad 111, 112, 113 and 114 is selected along with calibration ring 114. Four lines of the input-output port of microprocessor 200 are selected. Software for microprocessor 200 is configured for output select one at a time. Ports A, B, or C may be suitable. Because it is arbitrary, PA0 to PA3 limits of microprocessor 200 will be connected to leads 116, 117, 118 and 122. Digital switch clock multiplexer 121 and dial selected multiplexer 122 control lines are connected to the same three input-output lines of microprocessor 200. Again, ports A, B, or C are suitable. PA4 to PA6 are assigned to connect to multiplexer 200 control lines.

Analog to digital converter 136 output lines can be connected to a combination of ports. One output line of the microprocessor 200 is required to clock the serial representation of the eight bit digital number out. One input line of the microprocessor 200 is connected to the analog digital serial output line. The output line is used to enable the analog to digital converter to sample the analog input. Analog to digital enables the sampling PB0 in Port A, B, or C configured as input. Analog to digital serial clock input PB1 can be port A, B, or C configured as input. Analog to digital serial data output PB 2 can be Port A, B, C, or D configured as output.

The dual phase clock is a five hundred kHz square wave pierce oscillator clock employing a hex inverter and amplifiers made by Motorola MC14069 and a clock Motorola Part Number 748C74. The input to the clock is 500 kHz squarewave and the output is 250 kHz squarewave, the output being inverted. With respect to microprocessor 200, Motorola Microprocessor 68HC05 may be used. The port assignments labels are listed in Motorola Microprocessor literature.

What is claimed is:

1. An apparatus for remotely monitoring the position of a rotatable member, relative to a substrate spaced apart from the rotatable member, as the rotatable member is rotated about an axis of rotation comprising:
   (a) a first variable width electrode array disposed on a surface of the substrate delimiting a first center portion, an aperture in said substrate located in said center portion for receiving an axle affixed to the rotatable member, a first center electrode in said center portion on said surface of said substrate circumscribing said first aperture and a first calibration ring circumscribing and spaced apart from said first center electrode, said electrode array, center electrode and rotatable member having a capacitance when a potential is applied thereto;

(b) first, second, third and fourth switches, said first and second switches connected to each other and to a first variable width electrode and said third and fourth switches connected to each other and to said first center electrode;

(c) a resistor and a capacitor adapted to be connected to a constant potential, said resistor and capacitor in electrical communication with said fourth switch whereby current flowing through said resistor in response to said constant potential is proportional to the capacitance formed by said first electrode array, said center electrode and said rotatable member;

(d) a differential amplifier in electrical communication with said resistor and capacitor;

(e) an analog to digital converter connected to said differential amplifier.

2. The apparatus of claim 1 further including fifth and sixth switches connected to each other and to said first calibration ring.

3. The apparatus of claim 2 further including a microprocessor, said microprocessor connected to said analog to digital converter and to said first, second, fifth and sixth switches.

4. The apparatus of claim 1 further including a low-pass filter, said low-pass filter in electrical communication with said resistor and connected to said differential amplifier.

5. The apparatus of claim 3 further including a unity gain buffer, said unity gain buffer connected to said low-pass filter and to said resistor.

6. The apparatus of claim 2 wherein said variable width electrode array further includes a second variable width electrode, and seventh and eighth switches, said seventh and eighth switches connected to each other and to said second variable width electrode.

7. The apparatus of claim 1 further including a first multiplexer in electrical communication with said third and fourth switches.

8. The apparatus of claim 1 further including first and second clock and first and second AND Gate, said first clock connected to said first switch through said first AND Gate and said second clock connected to said second switch through said second AND Gate.

9. The apparatus of claim 1 further including first and second clocks and third and fourth AND Gate, said first clock connected to said third switch through said third AND Gate and said second clock connected to said fourth switch through said fourth AND Gate.

10. The apparatus of claim 7 further including third and fourth AND Gate, said first multiplexer connected to said third switch through said third AND Gate and connected to said fourth switch through said fourth AND Gate.

11. The apparatus of claim 1 further including a second multiplexer connected to said fourth switch.

12. The apparatus of claim 1 wherein said first variable width electrode array contains first and second variable width electrodes and said apparatus further includes another substrate spaced apart from another rotatable member on which there is disposed a second variable width electrode array containing third and fourth variable width electrodes, a second center electrode and a second calibration ring, all of said first, second, third, and fourth variable width electrodes each having individual first, second, third and fourth free edges, the first free edge being longer than the third free edge of the same electrode, and said apparatus further includes seventh, eighth, ninth and tenth switches, said seventh and eighth switches connected to each other and to said second variable width electrode of said first electrode array and the ninth and tenth switches connected to each other and to said second center electrode.

13. The apparatus of claim 12 further including a second multiplexer, said second multiplexer in electrical communication with said fourth and tenth switches.

14. The apparatus of claim 1 further including a second substrate and rotatable member on which there is disposed a second variable width electrode array, said second variable width electrode array containing a second center electrode and a second calibration ring.

15. The apparatus of claim 14 further including fifth and sixth switches connected to each other and to said second calibration ring.

16. The apparatus of claim 14 further including ninth and tenth switches connected to each other and to said second center electrode.

17. The apparatus of claim 16 further including a first multiplexer in electrical communication with said third and fourth switches.

18. The apparatus of claim 17 further including a second multiplexer connected to said fourth and tenth switches.

19. The apparatus of claim 18 further including a microprocessor connected to said first, second, fifth and sixth switches and to said analog to digital converter.

20. An electrode array disposed on a surface of a substrate comprising:

(a) a variable width electrode delimited by first, second, third, and fourth free edges, said first free edge being longer than said third free edge and said fourth free edge delimiting a center portion;

(b) an aperture in said center portion of said substrate;

(c) a center electrode circumscribing said aperture; and, (d) a continuous, electrically conductive calibration ring spaced apart from said center electrode and said variable width electrode, in electrical communication with said center electrode.

21. The electrode array of claim 20 wherein said electrode array comprises a single variable width electrode and the first and third free edges of said single variable width electrode are in spaced apart confronting relationship with one another and further including another electrode, spaced apart from said first and second free edges of said variable width electrode, having a free edge co-extensive with the third free edge of said variable width electrode.

22. The electrode array of claim 21 wherein said variable width electrode substantially circumscribes said center electrode, said calibration ring and said another electrode.

23. The electrode array of claim 21 wherein said calibration ring circumscribes said variable width electrode, said another electrode and said central electrode.

24. The electrode array of claim 21 wherein said calibration ring circumscribes said variable width electrode, said another electrode and said central electrode and said another electrode is disposed between said variable width electrode and said central electrode.

25. The electrode array of claim 20 wherein said variable width electrode is composed of first and second variable width electrodes, each of said first and second variable width electrodes being delimited by individual first, second, third and fourth free edges, the first free edge of said first variable width electrode being longer than the third free edge of said first variable width electrode and the first free edge of said second variable width electrode being longer than the third free edge of said second variable width electrode, the first free edge of the first variable width electrode in confronting spaced apart relationship with the third free edge of said second variable width electrode and another electrode, having a free edge in spaced apart confronting relationship with the first free edge of said first variable width electrode and the second free edge of said second variable width electrode.

26. The electrode array of claim 25 wherein said first and second variable width electrodes circumscribe said center electrode, said calibration ring and said other electrode.

27. The electrode array of claim 25 wherein said calibration ring circumscribes said center electrode, said first and second variable width electrodes and said another electrode.

28. The electrode array of claim 20 including first, second, and third variable width electrodes, each of said first and second and third variable width electrodes being delimited by individual first, second, third and fourth free edges, the first free edge of the first variable width electrode being longer than the third free edge of the same electrode, the first free edge of the second variable width electrode being longer than the third free edge of the same electrode and the first free edge of the third variable width electrode being longer than the third free edge of the same electrode, a calibration ring and a center electrode, said center electrode disposed in said center portion.

29. The electrode array of claim 28 wherein said calibration ring circumscribes said first, second, and third variable width electrodes.

30. The electrode array of claim 28 wherein said first, second, and third variable width electrodes circumscribe said calibration ring and said center electrode.

31. The electrode array of claim 28 wherein the third free edge of said first variable width electrode is in confronting, spaced apart relationship with the first free edge of said third variable width electrode and the third free edge of the third variable width electrode is in confronting spaced-apart relationship with the first free edge of said second variable width electrode and the third free edge of said second variable width electrode is in confronting spaced-apart relationship with the first free edge of said first variable width electrode.

32. The electrode array of claim 27 wherein said other electrode is disposed between said first variable electrode and said center electrode.

* * * * *

UNITED STATES PATENT AND TRADEMARK OFFICE
CERTIFICATE OF CORRECTION

PATENT NO. : 5,136,286
DATED : August 4, 1992
INVENTOR(S) : John E. Veneruso

It is certified that error appears in the above-identified patent and that said Letters Patent is hereby corrected as shown below:

Column 3, line 33, delete the word "with" and insert -- width --.

Column 3, line 35, delete the words "is a".

Column 10, line 5, delete the Arabic numeral "24" and insert -- 124 --.

Column 11, line 34, delete the Arabic numeral "13" and insert -- 131 --.

Column 12, line 4, delete the word "witches" and insert -- switches --.

Column 15, line 29, delete the word "including".

Column 15, line 29, after the Arabic numeral "20" insert -- wherein said variable width electrodes includes --.

Signed and Sealed this

Seventeenth Day of August, 1993

Attest:

BRUCE LEHMAN

*Attesting Officer*         Commissioner of Patents and Trademarks